United States Patent
Takahashi et al.

(10) Patent No.: US 10,824,858 B2
(45) Date of Patent: Nov. 3, 2020

(54) OBJECT MANAGEMENT DEVICE

(71) Applicant: NEC Corporation, Tokyo (JP)

(72) Inventors: Toru Takahashi, Tokyo (JP); Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 125 days.

(21) Appl. No.: 16/084,839

(22) PCT Filed: Mar. 2, 2017

(86) PCT No.: PCT/JP2017/008306
§ 371 (c)(1),
(2) Date: Sep. 13, 2018

(87) PCT Pub. No.: WO2017/159384
PCT Pub. Date: Sep. 21, 2017

(65) Prior Publication Data
US 2019/0080165 A1     Mar. 14, 2019

(30) Foreign Application Priority Data

Mar. 14, 2016   (JP) .................................. 2016-049877

(51) Int. Cl.
| | |
|---|---|
| *G06K 9/46* | (2006.01) |
| *G06K 9/00* | (2006.01) |
| *G06K 9/62* | (2006.01) |
| *G06K 9/32* | (2006.01) |

(52) U.S. Cl.
CPC ..... *G06K 9/00577* (2013.01); *G06K 9/00496* (2013.01); *G06K 9/3216* (2013.01); *G06K 9/46* (2013.01); *G06K 9/629* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0170613 | A1* | 9/2003 | Straus ...................... | C12Q 1/06 435/5 |
| 2009/0278923 | A1* | 11/2009 | Endo ....................... | G06T 7/001 348/79 |
| 2010/0200649 | A1* | 8/2010 | Callegari ................ | G06F 17/00 235/375 |
| 2011/0194737 | A1* | 8/2011 | Sharma .............. | G06K 9/00577 382/112 |

(Continued)

FOREIGN PATENT DOCUMENTS

| | | |
|---|---|---|
| EP | 2062229 | 12/2011 |
| JP | 7-260427 | 10/1995 |

(Continued)

OTHER PUBLICATIONS

International Search Report dated May 30, 2017, in corresponding PCT International Application.

*Primary Examiner* — Omar S Ismail
(74) *Attorney, Agent, or Firm* — Finnegan, Henderson, Farabow, Garrett & Dunner, L.L.P.

(57) ABSTRACT

An object management device manages an object based on a microscopic pattern on the surface of the object included in an image of the surface of the object. The object management device has a position correction unit. The position correction unit aligns the image based on the microscopic pattern appearing in common on a plurality of objects.

15 Claims, 11 Drawing Sheets

(56) References Cited

U.S. PATENT DOCUMENTS

| | | | | |
|---|---|---|---|---|
| 2013/0081882 A1* | 4/2013 | Lin | ................... | G01N 1/32 |
| | | | | 175/428 |
| 2014/0205153 A1* | 7/2014 | Sharma | .............. | G06K 9/00577 |
| | | | | 382/109 |
| 2017/0345725 A1* | 11/2017 | Hu | ................... | G06T 7/001 |

FOREIGN PATENT DOCUMENTS

| | | |
|---|---|---|
| JP | 10-040389 | 2/1998 |
| JP | 2007-534067 | 11/2007 |
| JP | 4337422 | 7/2009 |
| JP | 4775727 | 7/2011 |
| JP | 2013-196418 | 9/2013 |
| JP | 2014-029678 | 2/2014 |
| WO | WO 2009/131209 | 10/2009 |
| WO | WO 2014/163014 | 10/2014 |
| WO | WO 2016/035774 | 3/2016 |

* cited by examiner

OBJECT MANAGEMENT DEVICE

CROSS-REFERENCE TO RELATED PATENT APPLICATIONS

This application is a National Stage Entry of International Application No. PCT/JP2017/008306, filed Mar. 2, 2017, which claims priority from Japanese Patent Application No. JP 2016-049877, filed Mar. 14, 2016. The entire contents of the above-referenced applications are expressly incorporated herein by reference.

TECHNICAL FIELD

The present invention relates to an object management device, an object management method and a program.

BACKGROUND ART

Traditionally, objects such as industrial products and commercial products are provided with production numbers, barcodes, QR codes or the like, and management of quality and distribution of the individual products is thereby carried out. Moreover, there is a technique of providing the individual products with IC tags or RFIDs and, by a wireless communication system, efficiently realizing comprehensive product management from production to distribution and sales of the products and prevention of loss, theft and counterfeiting of the products.

However, in the object management method for products using product numbers, barcodes, QR codes, IC tags or RFIDs, there is a need to provide the individual products with product numbers or the like. Therefore, there is a problem that the cost gets more enormous in proportion to the production volume of products. Moreover, depending on products, it is impossible to directly write production numbers or barcodes or attach the abovementioned tags onto small metal parts such as screws and bolts, resin goods and so on. Besides, even for products on which barcodes can be written or tags can be attached physically, giving the barcodes or the tags has a problem of impairing the design such as appearance and design of the products.

Thus, there is a proposed method for individual identification and management of individual products by acquiring a difference in spontaneous microscopic pattern generated in the same production process, such as microscopic irregularity and motif on the surface of a product and a random pattern on the surface of a material, as an image with the use of an imaging device such as a camera and recognizing the microscopic pattern.

For example, Patent Document 1 describes a goods confirmation device that affixes a protective film to a specific part of the surface of a product, acquires a random pattern on the surface of the product at the protective film affixing site as an image with the use of an imaging device and uses captured images obtained.

Further, Patent Document 2 describes a product identification unit that captures an orange-peel pattern formed on the surface of a part or a product with a camera and uses an image feature of the orange-peel pattern included in the captured image.

Further, Patent Document 3 describes an authenticity judgment method in which artificially uncontrollable microscopic shape information generated in printing of a minute mark is considered as an individual identifier and this individual identifier is captured with a camera or the like.

Further, Patent Documents 4, 5 and 7 each describe a method for goods authenticity judgment, for the purpose of individual identification and goods authenticity judgment, using a random pattern of taggant (fine particles) on the goods and a microscopic random pattern that is originally owned by an article itself and hard to be or cannot be copied.

Further, Patent Document 6 describes a method of extracting a unique local structural feature owned by a person or an individual and recognizing a person or an artifact. Moreover, Patent Document 8 describes a method of inspecting the quality of printing based on the position or a pattern drawn on a printed matter such as a banknote ticket.

Patent Document 1: Japanese Patent No. 4337422
Patent Document 2: WO2014/163014
Patent Document 3: Japanese Patent No. 4775727
Patent Document 4: Japanese Translation of PCT International Application Publication No.
Patent Document 5: Japanese Unexamined Patent Application Publication No. JP-A 2013-196418
Patent Document 6: Japanese Patent Application No. 2010-509240 (Re-publication of PCT International Application Publication No. 2009/131209)
Patent Document 7: Japanese Unexamined Patent Application Publication No. JP-A 2014-029678
Patent Document 8: EP2062229B1 (Japanese Translation of PCT International Application Publication No. JP-A 2010-503099)

In the case of carrying out individual management based on a microscopic pattern on the surface of an object, there is a need to, in registration and in matching, observe the microscopic pattern from the same image area including a posture. For that, there is a need to correctly align a captured image.

Therefore, Patent Documents 1, 2, 3, 4 and 7 each describe a technique to apply a mark for alignment to an object and align a captured image with the use of a shape which a plurality of objects have in common. To be specific, in Patent Document 1, a cross mark is applied onto an object, the position of the cross mark on the image is specified by a matching method such as a correlation method and a sequential similarity detection algorism, and an observation area is determined with reference to the specified position. In Patent Document 2, the position of at least part of a logo on an object is specified, and an image with an orange-peel pattern is normalized with reference to the specified position. In Patent Documents 3 and 4, the position of a rectangle is specified in an image, and an area surrounded by the specified rectangle is set as an observation area. In Patent Document 7, a mark having a specific shape such as a letter of L, a circle, a rectangle and a rhombus is applied to a product and, based on the mark, the inclination and scale of an image obtained by imaging the product are corrected.

However, the patterns for alignment such as a cross mark, a logo, a rectangle and a letter of L described in Patent Documents 1 to 4 and 7 each have a size allows a person to visually recognize with ease, namely, a far larger size than a microscopic pattern on the surface of an object. Therefore, even if the accuracy of matching at the time of specification of an alignment pattern is high, an alignment error that cannot be ignored in the scale of a microscopic pattern occurs. For example, assuming the line width of an alignment pattern is 1 mm and the error of matching accuracy in the correlation method, the sequential similarity detection alignment or the like is 1%, an alignment error of 0.01 mm occurs. Since the size (the line width or the like) of a microscopic pattern is a micrometer scale (0.001 mm to 0.1 mm) in general, occurrence of an alignment error of 0.01 mm greatly worsens the accuracy of individual identification and authenticity judgment.

SUMMARY

An object of the present invention is to provide an object management device which solves the abovementioned problem.

An object management device as an aspect of the present invention is an object management device that manages an object based on a microscopic pattern on a surface of the object included in an image of the surface of the object. The object management device includes a first position correction unit configured to align the image based on the microscopic pattern appearing in common on a plurality of objects.

Further, an object management method as another aspect of the present invention is an object management method for managing an object based on a microscopic pattern on a surface of the object included in an image of the surface of the object. The object management method includes aligning the image based on the microscopic pattern that appears in common on a plurality of objects.

Further, a computer program as another aspect of the present invention includes instructions for causing a computer to function as a first position correction unit. The computer is configured to manage an object based on a microscopic pattern on a surface of the object included in an image of the surface of the object. The first position correction unit is configured to align the image based on the microscopic pattern that appears in common on a plurality of objects.

With the configurations described above, the present invention allows for accurately aligning an image.

This is because the image is aligned based on a microscopic pattern that appears on a plurality of objects in common.

EXEMPLARY EMBODIMENTS

Individual management based on a microscopic pattern on the surface of an object utilizes a fact that on the surfaces of a plurality of products produced through the same production process, microscopic patterns which are unique to the individual products are generated. It was found in a research by the inventors of the present invention that on the surfaces of a plurality of products produce through the same production process, a microscopic pattern which is common to the plurality of products is present, other than the microscopic patterns unique to the individual products. The present invention is proposed based on such a finding and mainly featured by aligning an image based on the microscopic pattern common to the plurality of products. Below, the present invention will be described in detail by using some exemplary embodiments.

First Exemplary Embodiment

Figure 1:
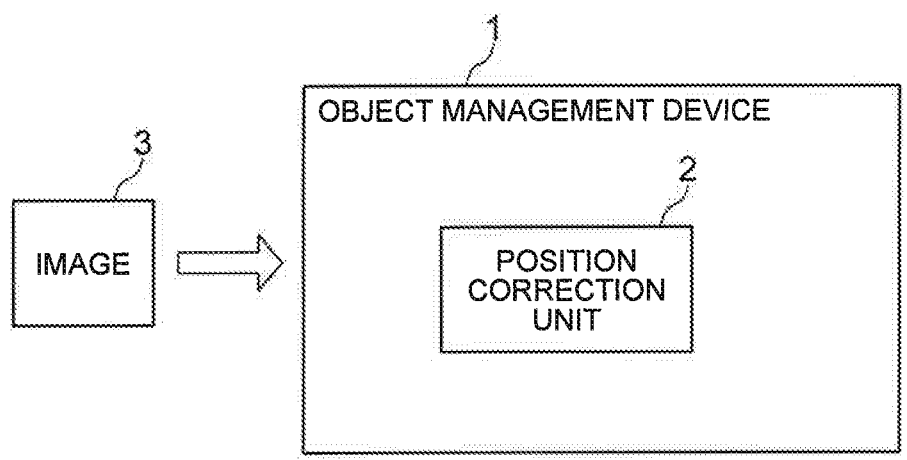
FIG. 1 is a block diagram of an object management device according to a first exemplary embodiment of the present invention.

FIG. 1 is a block diagram of an object management device 1 according to a first exemplary embodiment of the present invention.

The object management device 1 according to the present invention is a device that manages an object based on a microscopic pattern on the surface of the object, included by an image 3 obtained by imaging the surface of the object. The object management device 1 has a position correction unit 2. The position correction unit 2 has a function to align the captured image 3 based on a microscopic pattern that appears in common on a plurality of objects. The position correction unit 2 is also referred to as a first position correction unit. Herein, it is preferable that the microscopic pattern is a micrometer scale.

Figure 2:
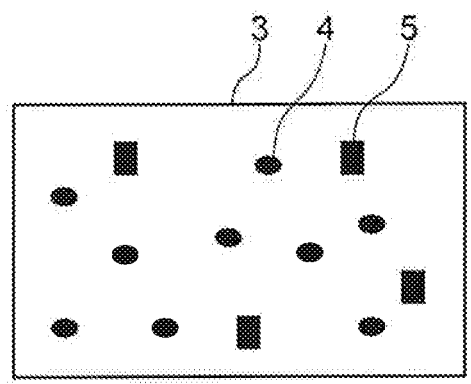
FIG. 2 is a schematic view of an image obtained by capturing the surface of an object.

FIG. 2 is a schematic view of the image 3 obtained by imaging the surface of an object. In FIG. 2, black circles 4 drawn in the image schematically represent a microscopic pattern which is unique to each object, and blacked-out rectangles 5 schematically represent a microscopic pattern which is common to a plurality of objects.

The object management device 1 thus configured functions in the following manner. When receiving the image 3 obtained by imaging the surface of an object, the object management device 1 uses the position correction unit 2 to align the image 3 based on the microscopic pattern 5 appearing in common on a plurality of objects. Then, the object management device 1 manages the object based on the microscopic pattern 4 included in the aligned image 3

Thus, the object management device 1 according to this exemplary embodiment can correctly align the captured image 3.

This is because the captured image 3 is aligned based on the microscopic pattern 5 that appears in common on a plurality of objects.

For example, assuming the sizes (the line width or the like) of the microscopic patterns 4 and 5 are micrometer-scale (0.001 mm to 0.1 and an alignment error is 1%, an alignment error of 0.00001 mm to 0.001 mm occurs. However, this level of error is allowable in the scale (0.001 mm to 0.1 mm) of the microscopic pattern 4. On the contrary, in a case where not a microscopic pattern but, for example, an alignment pattern with a line width of 1 mm is used, an alignment error of 0.01 mm occurs even when an alignment error is also 1%, and such an error cannot be ignored in the scale (0.001 mm to 0.1 mm) of the microscopic pattern 4.

Second Exemplary Embodiment

Figure 3:
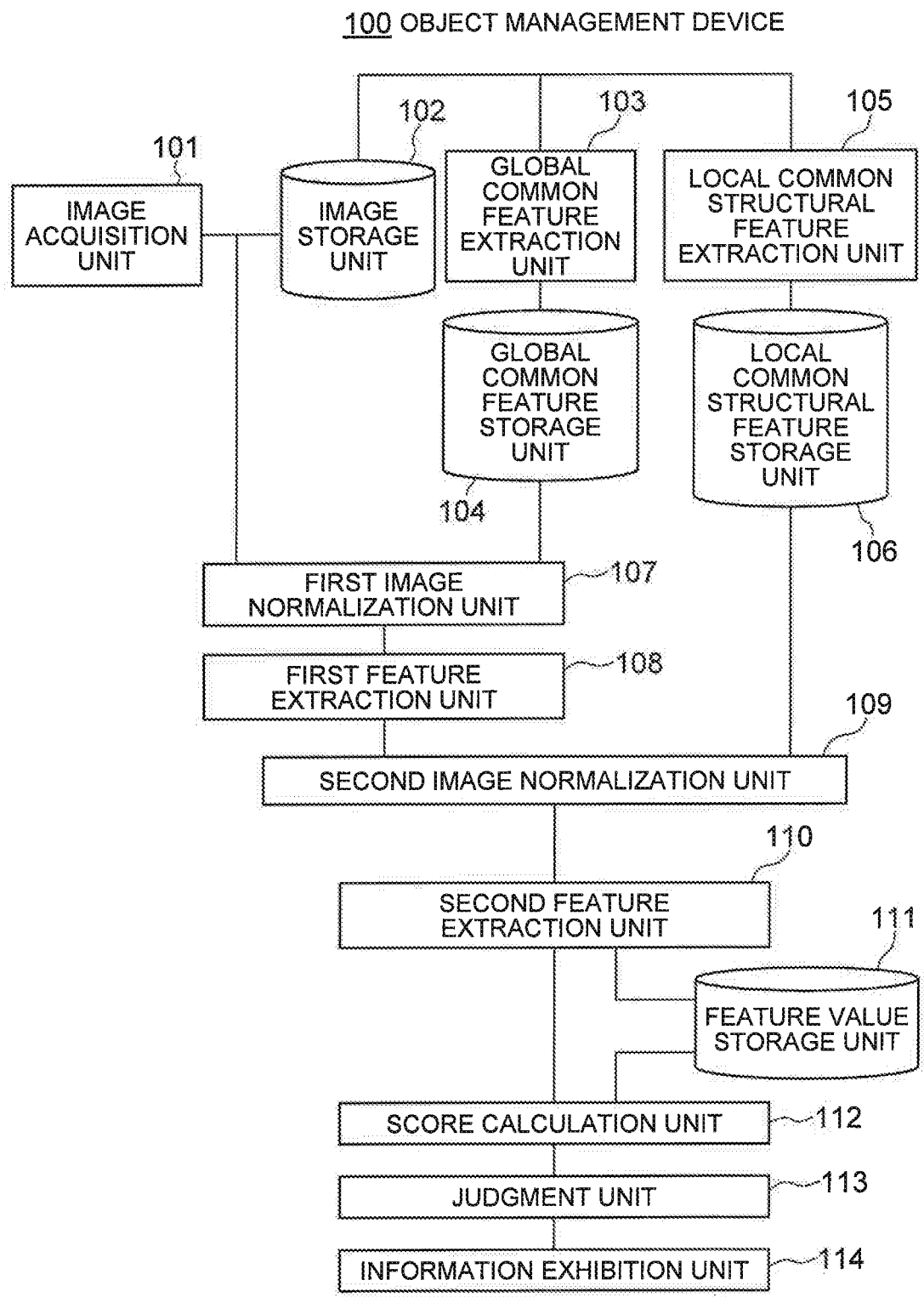
FIG. 3 is a block diagram of an object management device according to a second exemplary embodiment of the present invention.

Next, a second exemplary embodiment of the present invention will be described. FIG. 3 is a block diagram of an object management device 100 according to the second exemplary embodiment of the present invention.

The object management device 100 according to this exemplary embodiment includes an image acquisition unit 101, an image storage unit 102, a global common feature extraction unit 103, a global common feature storage unit 104, a local common structural feature extraction unit 105, a local common structural feature storage unit 106, a first image normalization unit 107, a first feature extraction unit 108, a second image normalization unit 109, a second feature extraction unit 110, a feature value storage unit 111, a score calculation unit 112, a judgment unit 113, and an information exhibition unit 114.

The image acquisition unit 101 has a function to acquire an image of the surface of a management target product. The image storage unit 102 has a function to retain a captured image obtained by the image acquisition unit 101. The global common feature extraction unit 103 has a function to calculate a global feature that is common to a group of management targets from the captured images stored in the image storage unit 102 and output as a template image. A global feature common to a group of management targets is also referred to as a non-microscopic pattern that appears in common on a plurality of objects. The global common feature storage unit 104 has a function to retain a template image calculated as a global common feature. The global common structural feature extraction unit 105 has a function to calculate a local structural feature that is common to a group of management targets from captured images stored in the image storage unit 102 and output as a local common structural feature template image. A local structural feature common to a group of management targets is also referred to as a microscopic pattern that appears in common on a plurality of objects. The local common structural feature storage unit 106 has a function to retain a feature template image of a local common structure. The first image normalization unit 107 has a function to make the directions and positions of identification targets in captured images identical based on the captured images and the template image of the global common feature. The first image normalization unit 107 is also referred to as a second position correction unit. The first feature extraction unit 108 has a function to emphasize a local structural feature on a captured image normalized by the first image position normalization unit 107 (a first normalization image). The first feature extraction unit 108 is also referred to as a microscopic pattern emphasis unit. The second image normalization unit 109 has a function to, by using a feature template image of a local common feature and a captured image on which a local structural feature has been emphasized by the first feature extraction unit 108, geometrically correct the captured image after normalization by the first image normalization unit 107 again. The second feature extraction unit 110 has a function to extract a feature value used for individual identification or individual authentication of an article from an image normalized by the second image position normalization unit 109 (a second normalization image). The feature value storage unit 111 has a function to retain a feature value. The score calculation unit 112 has a function to compare a feature value extracted from a captured image by the second feature extraction unit 110 with a feature value stored in the feature value storage unit 111 and calculate a score indicating the degree of similarity of both the feature values. The score calculation unit 112 is also referred to as a matching unit. The judgment unit 113 has a function to output the result of judgment of a management target based on the calculated score. The information exhibition unit 114 has a function to exhibit individual management information based on the judgment result.

Figure 4:
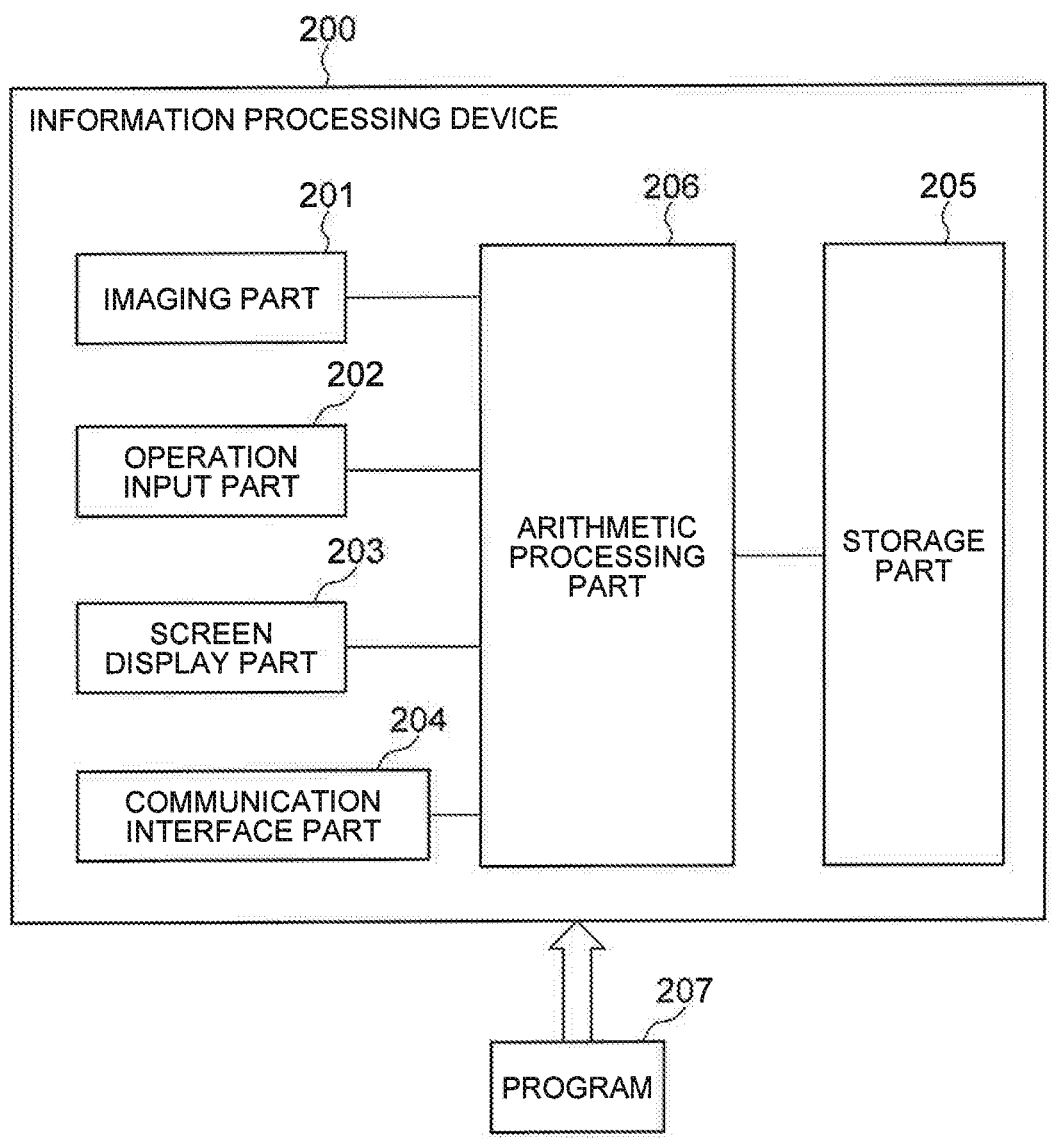
FIG. 4 is a block diagram showing an example of a hardware configuration of an object management device of the present invention.

The object management device 100 can be realized by, for example, as shown in FIG. 4, an information processing device 200 such as a personal computer and a smartphone, and a program 207. The information processing device 200 has an imaging part 201 such as a camera, an operation input part 202 such as a keyboard and a mouse, a screen display part 203 such as a liquid crystal display, a communication interface part 204, a storage part 205 such as a memory and a hard disk, and an arithmetic processing part 206 such as one or more microprocessors. The program 207 is loaded from an external computer-readable recording medium to the memory when the information processing device 200 is started, and controls the operation of the arithmetic processing part 206, thereby realizing, on the arithmetic processing part 206, functional units such as the image acquisition unit 101, the image storage unit 102, the global common feature extraction unit 103, the global common feature storage unit 104, the local common structural feature extraction unit 105, the local common structural feature storage unit 106, the first image normalization unit 107, the first feature extraction unit 108, the second image normalization unit 109, the second feature extraction unit 110, the feature value storage unit 111, the score calculation unit 112, the judgment unit 113 and the information exhibition unit 14.

Next, the operation of the object management device 100 according to this exemplary embodiment will be described with the use of the drawings. The operation of the object management device 100 is roughly divided into the following three:
(a) operation of preprocessing for extracting a common feature;
(b) operation of individual registration; and
(c) operation of individual identification and individual matching.

[Preprocessing: Global Common Feature Extraction and Local Common Structural Feature Extraction Process]

First, as a process of previous stage, an operation of preprocessing for extracting a common feature will be described.

Figure 5:
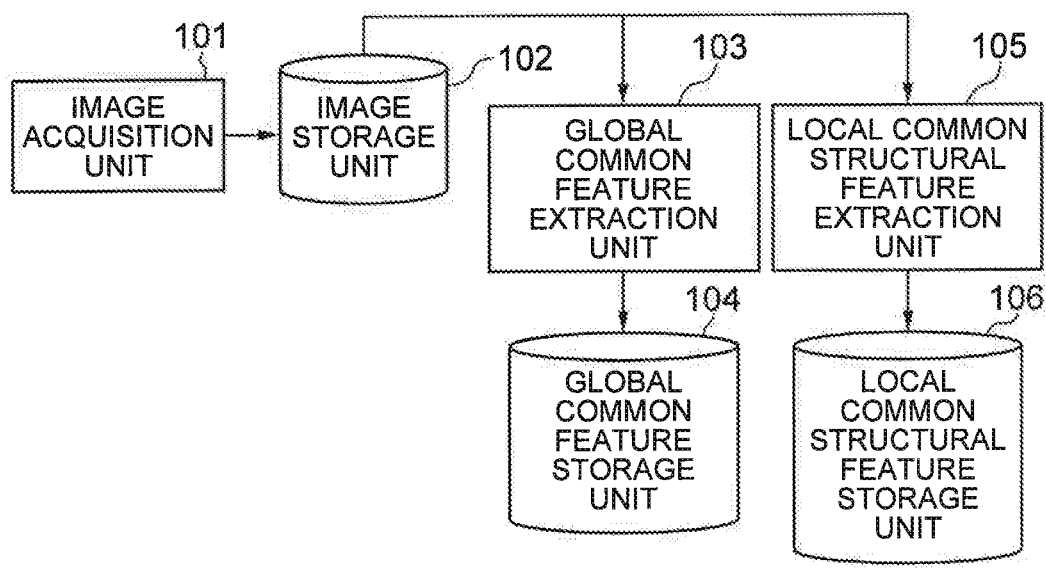
FIG. 5 is an operation flow of preprocessing for extracting a global common feature and a local common structural feature in the object management device according to the second exemplary embodiment of the present invention.

FIG. 5 is an operation flow of preprocessing for extracting a global common feature and a local common structural feature.

<Acquisition and Save of Image>

First, at least one image of a pattern on the surface of a management target product acquired by the image acquisition unit 101 is stored in the image storage unit 102. That is, the image acquisition unit 101 acquires an image of a surface pattern of each of a plurality of management target products and stores the image into the image storage unit 102. The image acquisition unit 101 may acquire one image for each product or may acquire a plurality of image for each product. The image acquisition unit 101 may be any of an imaging device such as a camera and a scanner, a device for acquiring image data via a network, and a device for acquiring image data via a storage medium such as a CD-ROM.

Further, in a case where there are a plurality of production dies for producing a management target product, the image acquisition unit 101 saves an acquired image of a surface pattern of a product into the image storage unit 102 for each production die. Herein, a production die refers to a die or a cutting device used for producing a product by casting, heading, cutting, or the like.

For example, assuming products are mass-produced by casting or heading with the use of a production die A1 and, in parallel to this, products are mass-produced by casting or heading with the use of a production die A2 that is the same as the production die A1, the image acquisition unit 101 stores an image of a surface pattern of a product produced with the production die A1 and an image of a surface pattern of a product produced with the production die A2 separately into the image storage unit 102. At this time, a pattern which is unique to the production die A1 is transferred onto the entire surface of a product produced with the production die A1. Also, a pattern which is unique to the production die A2 is transferred onto the entire surface of a product produced with the production die A2.

Further, for example, assuming products are mass-produced by cutting with the use of a cutting device B1 and, in parallel to this, products are mass-produced by cutting with the use of a cutting device B2 that is the same as the cutting device B1, the image acquisition unit 101 stores an image of a surface pattern of a product produced with the cutting device B1 and an image of a surface pattern of a product produced with the cutting device B2 separately into the image storage unit 102. At this time, microscopic irregularities of surface roughness that is unique to the cross section of a blade of the cutting device B1 used for cutting appears on a cut face of a product produced with the cutting device B1. Also, microscopic irregularities of surface roughness that is unique to the cross section of a blade of the cutting device B2 used for cutting appears on a cut face of a product produced with the cutting device B2. The same processing method and device described herein are just examples, and other same production process and processing device can be handled in the same way.

<Global Common Feature Extraction Process>

Next, the global common feature extraction unit 103 retrieves at least one of the images stored in the image storage unit 102 and extracts a global feature that is common to the group of management target products. Herein, a global feature refers to a feature having a size that is large enough for a person to visually recognize. Moreover, a common global feature represents, for example, a common shape or the like such as a brand logo, a manufacturer name and a geometric mark, printed or stamped on a group of management target products. That is, a global feature is a pattern based on a design feature of an object such as a product. A global feature is also referred to as a non-microscopic pattern.

Meanwhile, a global common feature does not need to be limited to a common shape such as a brand logo, a manufacturer name and a geometric mark intentionally put by a manufacturer and may be a common motif of a surface pattern having a large size generated in the course of production of a group of management target products. For example, a group of management target products are subject to casting or heading with the use of a common production die, microscopic irregularities or the like of the die are transferred onto the surface of each of the management target products, and common microscopic irregularities of large size may be generated. In a case where such common microscopic irregularities of large size can be observed as a pattern on a captured image, this pattern can be utilized as a global common feature.

In extraction of a global common feature, for example, the global common feature extraction unit 103 exhibits a captured image to the user and, when the user visually checks the captured image and selects a logo part in the captured image, extracts the selected logo part as a global common feature. Alternatively, extraction of a global common feature may be realized by using a plurality of captured images of a management target product and statistically processing. For example, when captured images of several tens of individuals roughly aligned by user's manual operation are input, the global common feature extraction unit 103 extracts two-dimensional data alignment that is the average of pixel values of the aligned images as a global common feature. In this extraction method, a random pattern which is a unique feature to an individual is controlled and S/N (signal to noise ratio) of a global common feature is increased, so that it becomes useful in image normalization processing of latter stage. The global common feature extraction unit 103 may calculate a global common feature by a statistical method or a method based on machine learning, instead of obtaining a simple pixel value average.

The global common feature extraction unit 103 saves the calculated global common feature as a template image into the global common feature storage part 104. In registration and matching of each management target product, the global common feature saved in the global common feature storage part 104 can be used, so that the global common feature extraction unit 103 does not need to calculate a global common feature again at the time of registration or matching. It is needless to say that the global common feature extraction unit 103 may save an image acquired at the time of registration or matching into the image storage unit 102 and regularly calculate a global common feature to update a global common feature stored in the global common feature storage unit 104.

Further, at the time of calculation of a global common feature, the global common feature extraction unit 103 may add a weight onto each part of a common feature and save into the global common feature storage unit 104. For example, in a case where a logo mark that is common to a group of management target products is considered as a global common feature, it is possible to, by adding a high weight to a part in a pixel position where illumination change hardly occurs at the time of imaging, expect an effect of enhancing robustness of image position normalization of the latter stage.

Further, the global common feature extraction unit 103 may calculate a plurality of global common features and save them as a plurality of template images into the global common feature storage part 204. For example, regarding parts produced by casting or heading with the use of a plurality of dies, a difference in surface motif or random pattern for each production die is large, but a common unique feature is transferred to a certain extent onto parts made with the use of the same production die, and a global common feature for each die an be calculated. That is, the global common feature extraction unit 103, for each production die for producing an object such as a part, extracts a global common feature that appears in common on a plurality of objects produced with the use of the production die based on a plurality of images obtained by imaging the surfaces of the plurality of objects produced with the use of the production die. As a result of using such a global common feature for each die in an image position normalization process of latter stage, highly accurate alignment becomes possible, and consequently, an effect of increasing the accuracy of individual identification and individual authentication can be expected. Moreover, it becomes possible to judge what production die has been used for producing a management target part depending on whether the image position normalization process has succeeded or not, and an effect of reducing the amount of data at the time of carrying out individual identification can be expected.

<Global Common Structural Feature Extraction Process>

Subsequently, the global common structural feature extraction unit 105 retrieves at least one image stored in the image storage unit 102 and extracts a local structural feature which is common to a group of management target products. Herein, a local structural feature refers to a microscopic feature which corresponds to microscopic irregularities, motifs or the like on the surface of a product. Moreover, a common local structural feature refers to a microscopic feature which appears in common on the surfaces of a plurality of products. For example, a microscopic feature appearing in common on the surfaces of a plurality of products, such as a minute edge and a partial shape of the outline that is robust to illumination change in imaging, corresponding to microscopic irregularities on the surface of a product can be a common local structural feature. For example, in a case where management target products are produced by casting or heading with the use of a common production die, a structure such as local microscopic irregularities of the die is transferred onto the surface of each of the management target products, and common local microscopic irregularities occur. That is, a local structural feature is a pattern based on a feature occurring in the course of generation of an object such as a product. In a case where common microscopic irregularities can be slightly observed as a pattern on a captured image, the local common structural feature extraction unit 105 emphasizes such a pattern and utilizes it as a local common structural feature.

Meanwhile, a local common structural feature is not limited to being derived from a microscopic common structure of a surface pattern occurring in the course of production of a group of management target products. A local common structure feature may be derived from a partial shape of a minute edge or outline near a common shape intentionally inserted by a manufacturer, such as a brand logo, a manufacturer name and a geometrical mark.

As an example, the local common structural feature extraction unit 105 calculates the average and variance of differences of luminance value approximate planes for each local area of a captured image and normalizes luminance values based on the average and variance, thereby extracting a local structural feature. For example, the local common structural feature extraction unit 105 applies a luminance normalization process filter of each local area and emphasizes a microscopic structure in an image. A filter size (the size of a local area) at this time is determined based on the size of a random pattern or the width of repetition of a motif in a captured image. Meanwhile, a way to determine a filter size is not limited to the above. For example, the local common structural feature extraction unit 105 may apply a plurality of sizes and emphasize a microscopic structure. Moreover, a filter size (the size of a local area) may be determined by previously measuring the surface of a management target and calculating it from surface roughness and the resolution of the image acquisition unit, imaging magnification, or the like.

The details of the method for emphasizing a microscopic structure in an image by the local common structural feature extraction unit 105 is as follows. Firstly, as a premise, a captured image is a two-dimensional image in which pixel values are two-dimensionally arranged. The pixel values may be values on any color space, not limited specifically. For example, the pixel values may be values on an RGB color space or may be luminance values (Y) or color difference values (Cb, Cr) on a YCbCr color space. The local common structural feature extraction unit 105 considers each pixel of a captured image as a pixel of interest $P(p, q)$. Subsequently, the local common structural feature extraction unit 105 determines an approximate plane that is a function z approximately representing a set of pixel values $f(x, y)$ in a local area $\Delta S$ including the pixel of interest $P(p, q)$. Herein, x and y are variables showing coordinate positions in the local area $\Delta S$ of the pixel values. The local common structural feature extraction unit 105 further calculates a value which is proportion to a difference $\Delta(p, q)(=f(x, y)-z(p, q))$ between a pixel value $f(x, y)$ of a captured image and a value $z(p, q)$ of an approximate plane corresponding thereto as a structural feature value $g(p, q)$ regarding the captured image. The structural feature value $g(p, q)$ is calculated for every pixel in the captured image. The arrangement of the structural feature values $g(p, q)$ is an image with a local structural feature emphasized.

The abovementioned function z representing the approximate plane is expressed by $z(x, y)=ax+by+c$, which is a linear function of the variables x and y. The parameters a, h and c of the function can be determined so that the square of the difference between the function value $z(x, y)$ and the pixel value $f(x, y)$ is obtained and the sum of the squares for all x and y in the local area $\Delta S$ is minimized.

The structural feature value $g(p, q)$ can be obtained according to $g(p, q)=\{f(p, q)-z(p, q)\}/s$, where s is the standard deviation of a difference $\Delta(x, y)$ within the local area $\Delta S$.

Further, the local common structural feature extraction unit 105 may be configured to extract a local common structural feature by performing statistical processing on a plurality of captured images as well as the global common feature extraction unit 103. For example, the local common structural feature extraction unit 105 extracts a local structural feature for each of captured images of several tens of individuals and exhibits each image after extraction to the user. The local common structural feature extraction unit 105 may then exact, as a local structural common feature, a two-dimensional data array that the average of pixel values of a plurality of images exactly manually aligned by the user is obtained. In such an extraction method, a local structural feature that is a feature unique to an individual is suppressed, S/N (signal-to-noise ratio) of a locally common structural feature is improved and it becomes useful in the image normalization process in a subsequent stage. Further, the local common structural feature extraction unit 105 may obtain a local common structural feature by a statistical method or a method based on machine learning, instead of a simple pixel value average.

The local common structural feature extraction unit 105 stores the calculated local common structural feature as one template image into the local common structural feature storage unit 106. At the time of registration of each management target product and at the time of matching, the local common structural feature extraction unit 105 can use the local common feature stored in the local common structural feature storage unit 106 and does not need to calculate a local common structural feature again at the time of registration or matching. It is needless to say that by storing images acquired at the time of registration or matching into the image storage unit 102, the local common structural feature extraction unit 105 may regularly calculate a local common structural feature and update an old local common structural feature stored in the local structural feature storage unit 106.

Further, by causing the global common feature extraction unit 103 to output, in addition to a global common feature, a template image to which a local structural feature is also added with a small weight and apply the image feature extraction process of the subsequent stage to the template image, a local common structural feature may be approximately obtained.

Further, the local common structural feature extraction unit 105 may also calculate a weight for each dimension of a local common structural feature at the time of calculation of a local common structural feature and store it into the local common structural feature storage unit. With this, an effect of improvement of robustness of image position normalization in a subsequent stage can be expected. Herein, each dimension of a local common structural feature refers to a local common structural feature component extracted from one local area in the case of extracting local common structural features from a plurality of local areas of a captured image. In other words, in a case where there are n local areas of a captured image, a local common structural feature component is extracted from each of the local areas and one template image is formed by the n local common structural feature components, it is said that the template image has n-dimensional local common structural feature components.

Further, the local common structural feature extraction unit 105 may, not only extract a local common structural feature for forming one template image, but also calculate a plurality of local common structural features and save them as separate template images into the common structural feature storage unit 206. For example, regarding parts produced by casting or heading with the use of a plurality of dies, a difference of motifs or random patterns on the surfaces between the production dies is large, but contrarily, onto parts made with the use of the same production die, features common to the die are transferred to a certain extent, so that a local common structural feature for each die can be calculated. That is, the local common structural feature extraction unit 105, for each production die for producing objects such as parts, based on a plurality of images in which the surfaces of a plurality of objects produced with the use of the production die, extracts a local common structural feature which appears in common on the plurality of objects produced with the use of the production die. By using the local common structural feature for each die in the image position normalization process in the subsequent stage, highly accurate alignment is enabled and, as a result, the effect of improving the accuracy of individual identification and individual authentication can be expected. In addition, depending on the success or failure of the image position normalization process, it can be judged which production die has been used for making a management target part, and an effect of reduction of the amount of data to be searched at the time of individual identification can be expected.

[Operation in Registration]

Figure 6:
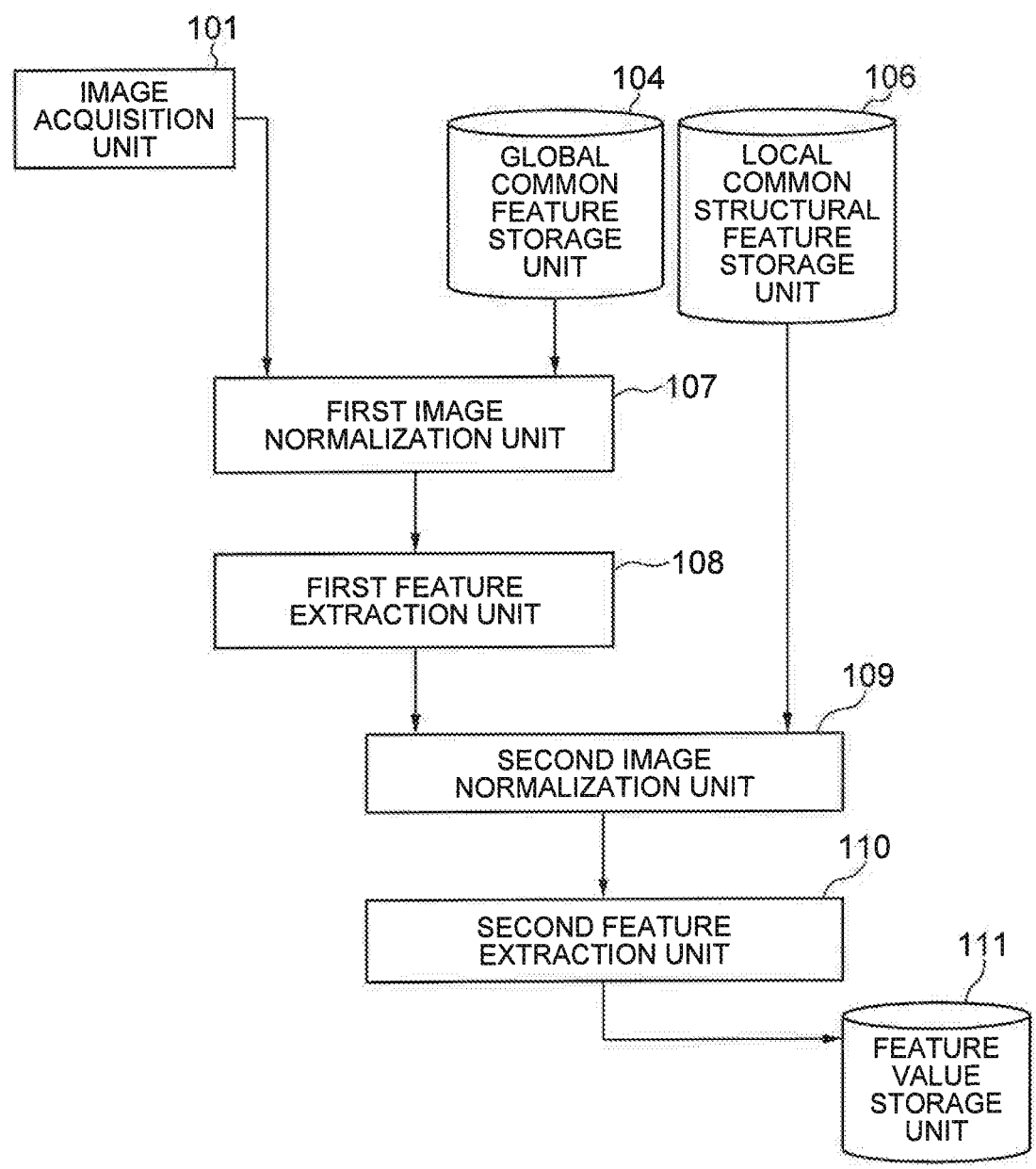
FIG. 6 is a processing flow of an individual registration operation in the object management device according to the second exemplary embodiment of the present invention.

Next, an individual registration operation of the object management device 100 according to this exemplary embodiment will be described. FIG. 6 shows a processing flow of the individual registration operation.

Firstly, a random pattern image of the surface of a management target obtained by the image acquisition unit 101 and a global common feature (a template image) stored in the global common feature storage unit 104 are inputted into the first image normalization unit 107. In a case where a global common feature (a template image) is stored for each production die, all global common features (template images) may be inputted, or only a global common feature (a template image) associated with a production die used in production of an individual registration target product may be inputted.

<First Image Normalization>

The first image normalization unit 107, as a first step, calculates a geometric deformation parameter based on a phase correlation of the inputted captured image and a low-frequency component of the inputted global common feature. For example, the first image normalization unit 107 applies Log-Polar transformation to a frequency spectrum obtained by executing Fourier transform on an image and estimates the rotation and scale between the two images (the captured image and the template image). Moreover, after correcting the rotation and scale, the first image normalization unit 107 estimates displacement of translation between the images.

Next, the first image normalization unit 107, as a second step, calculates a geometric deformation parameter that minimizes a pixel value difference between the captured image and the global common feature (the template image) and executes geometric deformation of the captured image with the use of the calculated geometric deformation parameter, thereby normalizing an image.

A geometric deformation parameter estimation method based on minimization of a pixel value difference is, for example, the Lucas-Kanade method. The first image normalization unit 107, for example, by using this method, sets the geometric deformation parameter obtained at the first step as an initial geometric deformation parameter and obtains a geometric deformation parameter which minimizes the sum of squared differences of the captured image and the common feature.

Further, the first image normalization unit 107 also applies a weight at each pixel position to the global common feature, thereby calculating a pattern unique to an individual acting as noise at the time of geometric deformation parameter estimation and a geometric deformation parameter with emphasis on a pixel position where illumination change at the time of imaging hardly occurs. As a result, there is an effect that improvement of robustness and accuracy of image position normalization can be expected.

Further, in the case of using a plurality of global common features (a plurality of template images), the first image normalization unit 107, at the first step, calculates a phase correlation between a captured image and each of the global common features (each of the template images) and utilizes each geometric deformation parameter and a correlation value obtained at the time. That is, the first image normalization unit 107 gives a geometric deformation parameter with the highest correlation value and a correlation value for each global common feature (each template image) as a weight with respect to each global common feature (each template image) at the second step, so that there is an effect that improvement of robustness and accuracy of image position normalization can be expected.

As described above, the first image normalization unit 107 obtains similarity or dissimilarity between images by an existing method, that is, pixel difference or correlation, by using the phase correlation of low-frequency components of an image, compare with the existing method for estimating alignment between images and geometric deformation parameter and estimate a parameter robustly against missing patterns in the image. However, between a captured image obtained from a certain management target product and a global common feature (a template image) of a group of management target products, only a low-frequency component is a common feature, so that it is difficult to carry out alignment with sufficient accuracy for individual identification or the like (this problem will be solved by the second image normalization unit 109 in this exemplary embodiment).

Further, in order to estimate a geometric deformation parameter with high accuracy by estimating the amount of translation at the subpixel level by image phase correlation, two images to be aligned need to be signals with good S/N over a sufficiently broad bandwidth in a frequency area and, at the same time, have a correlation. Moreover, the method based on image phase correlation can apply to homologous deformation between images (translation, rotation, scaling, the degree of freedom of a parameter: 4) but cannot apply to geometrical deformation w e same degree of freedom or more, for example, affine deformation (the degree of freedom of a parameter: 6) or projective deformation (the degree of freedom of a parameter: 8). On the contrary, the first image normalization unit 107 roughly carries out image alignment with an obtained geometric parameter as an initial value by phase correlation between images that is a frequency bandwidth in which only low-frequency components are effective, and then uses the Lucas-Kanade method, thereby being able to carry out image position normalization with high accuracy for geometric distortion of affine deformation or projective deformation in a captured image to a certain extent.

<First Feature Extraction>

Subsequently, the first feature extraction unit 108 receives the captured image after normalization by the first image normalization unit 107 as an input and outputs the captured image with a local structural feature emphasized as a feature extraction result. For example, the first feature extraction unit 108 calculates the average and variance of differences of luminance value approximate planes for each local area and normalizes luminance values based on them. Moreover, the first feature extraction unit 108 applies a luminance normalization process filter for each local area, for example, described in Patent Document 6 and emphasizes a microscopic structure in an image. A filter size (the size of a local area) at this time is determined based on the size of a random pattern in a captured image or the width of repetition of a motif. A way to determine a filter size is not limited to the above. For example, the first feature extraction unit 108 may apply a plurality of filter sizes and emphasize a microscopic structure. Moreover, the first feature extraction unit 108 may determine by measuring the surface of a management target in advance and calculating from surface roughness and the resolution of the image acquisition unit, shooting magnification or the like. Moreover, the first feature extraction unit 108 may use a method for emphasizing a microscopic structure in an image described in detail at the description of the local common structural feature extraction unit 105 to output the captured with a local structural feature emphasized as a feature extraction result.

<Second Image Normalization>

Subsequently, the second image normalization unit 109 receives the captured image outputted from the first feature extraction unit 108 and a local common structural feature (a template image) stored in the local common structural feature storage unit 106 as an input and estimates a geometrical deformation parameter that minimizes a difference in luminance value between these images. In a case where a local common structural feature (a template image) is stored for each production die, the second image normalization unit 109 may receive, as an input, only a local common structural feature (a template image) corresponding to a production die used for production of an individual registration target product.

For example, the second image normalization unit 109 carries out re-estimation of a geometric deformation parameter by using the Lucas-Kanade method as at the second step by the first image formalization unit 107.

Thus, the second image normalization unit 109 has an effect of correcting minute misalignment by obtaining a difference in pixel value between a captured image in which a microstructural feature has been emphasized by the first feature extraction unit 108 and a template image of a local common structural feature. Although image normalization with almost no misalignment error is achieved by the first image normalization unit 107, there is a case where the position of a microstructure used at the time of individual identification is not correct strictly. This is because the first image normalization is greatly affected by the pixel area of a global common feature and therefore the position of a microscopic edge or the like may be only roughly correct. The second image normalization unit 110 has a role of correcting minute misalignment after normalization by the first image normalization unit 107.

Further, it can be expected that the second image normalization unit 110 has an effect of, at the time of the second image normalization, increasing the degree of freedom of a geometric deformation parameter to be estimated as compared with the first image normalization and improving the accuracy of alignment. In a case where misalignment of images is large between a captured image and a global common feature (a template image), if the degree of freedom of a geometric deformation parameter is increased at the time of the first image normalization, a stable geometric deformation parameter cannot be obtained. On the other hand, by estimating a geometric deformation parameter with a small degree of freedom to keep images stable and almost aligned in the first image normalization and increasing the degree of freedom of the parameter in the second image normalization, an effect of enabling stable and highly accurate image normalization is realized.

<Second Feature Extraction>

Subsequently, the second feature extraction unit 110 selects a predetermined given number or less of pixels from the captured image normalized by the second image normalization unit 109. In this exemplary embodiment, a given area in the captured image normalized by the second image normalization unit 109 is an area for extracting a feature value for individual authentication or the like. Moreover, with regard to the selected pixels, which are pixels having been selected above, the second feature extraction unit 110 calculates a binary bit string as a feature value based on the magnitude relation of luminance values of the selected pixels.

For example, the second feature extraction unit 110 can realize the above by deciding a predetermined given number of pixel pairs and generating a binary bit string based on the magnitude relation of the selected pixel pairs. As a binary bit string thus generated is, for example, BRIEF (Binary Robust Independent Elementary Features) and BRISK (Binary Robust Invariant Scalable Key points). Moreover, in the selection of pixel pairs, the second feature extraction unit 110 can measure the width of repetition of a pattern or a motif in a captured image and thereby determine the average and variation of distances between pixels to be paired based on the average and variation of the widths of repetition. By thus setting, the following effect can be expected; it is possible to calculate a bit string expressing a difference between management target individuals as a major change factor and expect improvement of the accuracy of individual identification and individual matching.

Further, in the selection of pixels, the second feature extraction unit 110 may decide by preparing a large number of captured images of products of the same management target, products subject to the same management target surface processing and products of the same roughness and carrying out machine learning of them. In a case where a pattern is that of surface processing such as matt processing and sand blasting common to every product and a large amount of learning data on the pattern is available, there is an effect that improvement of the accuracy of individual identification and individual matching can be expected.

The second feature extraction unit 110 stores a calculated feature value into the feature value storage unit 111. At this time, the second feature extraction unit 110 links the serial number (identification number) of a management target and product information such as the name of a product, the time and date of production and the place of production with a feature value and stores into the feature value storage unit 111.

[Identification/Matching Operation]

Figure 7:
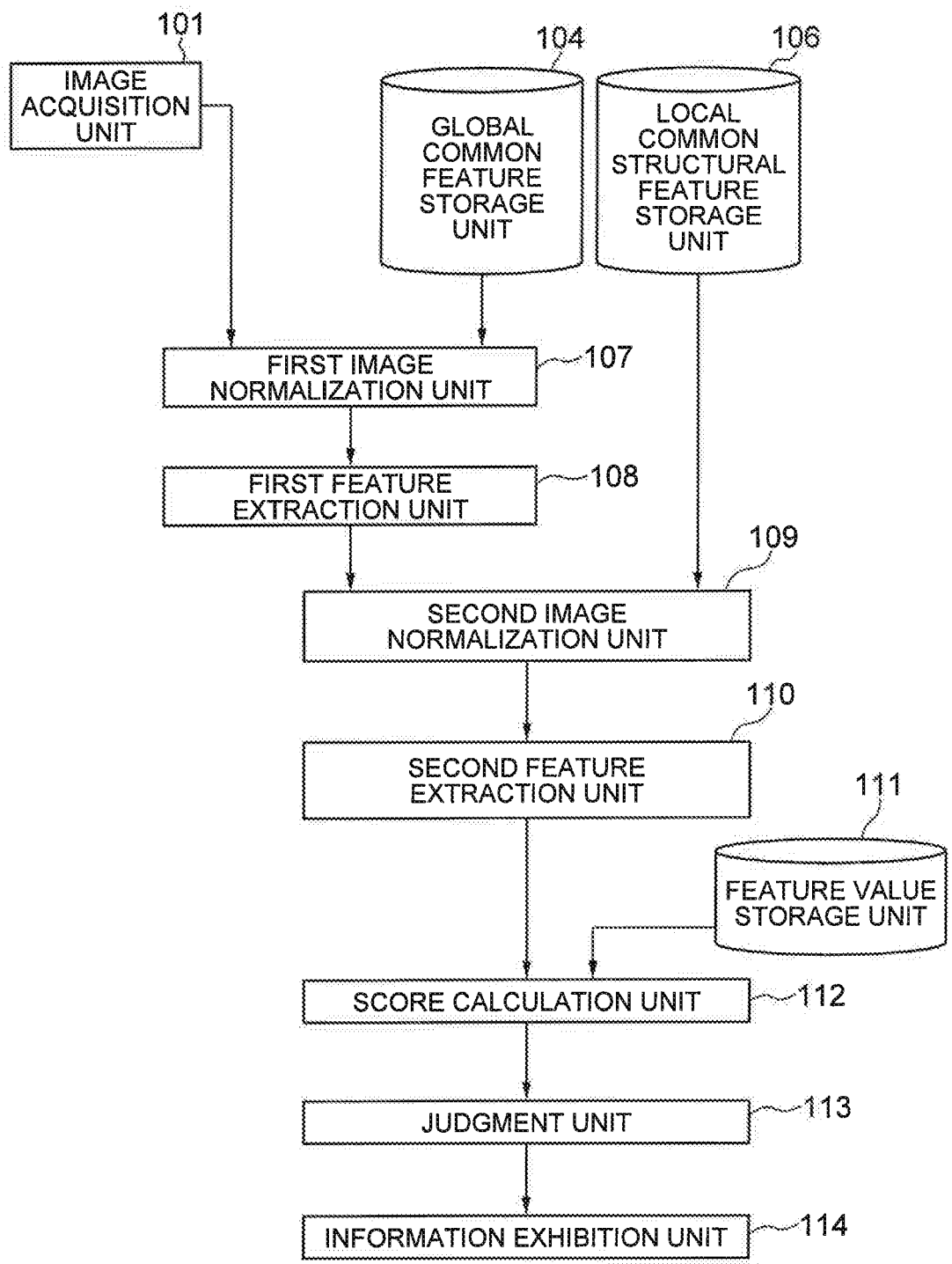
FIG. 7 is a processing flow of an individual identification and individual matching operation in the object management device according to the second exemplary embodiment of the present invention.

Next, an operation of individual identification and individual matching in this exemplary embodiment will be described. FIG. 7 is a processing flow of the operation of individual identification and individual matching.

First, based on a random pattern image of the surface of a management target obtained by the image acquisition unit 101 and a global common feature (a template image) stored in the global common feature storage unit 104, the first image normalization unit 107 executes first image normalization on a captured image. Herein, a management target refers to a product which is the target of individual identification and individual matching. Subsequently, the first feature extraction unit 108 receives the captured image after the first image normalization and outputs the captured image with a local structural feature emphasized. Subsequently, the second image normalization unit 109 receives the captured image with the local structural feature emphasized and a local common structural feature (a template image) stored in the local common structural feature storage unit 106, estimates a geometric deformation parameter that minimizes a difference in pixel value between these images, and outputs the captured image after second image normalization. Subsequently, the second feature extraction unit 110 selects a predetermined given number or less of pixels from the captured image after the second image normalization and, regarding selected pixels, which are pixels having been selected, calculates a binary bit string as a feature value based on the magnitude relation of luminance values of the selected pixels. That is similar to the operation in individual registration, so that the details thereof will be omitted.

Subsequently, the score calculation unit 112 compares the feature value extracted from the captured image of the management target by the second feature extraction unit 110 (hereinafter, referred to as a query feature value) with all feature values stored in the feature value storage unit 111 (hereinafter, referred to as registered feature values) and calculates a score representing similarity between the query feature value and the registered feature values. For example, the score calculation unit 12 calculates a score expressed with a binary bit as the score between the feature values. The score calculation unit 112 may be configured to calculate a Hamming distance between the feature values and obtains dissimilarity between the two feature values as the score. In this case, the score calculation unit 112 may obtain the calculated Hamming distance as the score without change or may execute any linear transform on the score and use as a normalized score. Meanwhile, the method of comparing the feature values is not limited to a Hamming distance and, for example, a Euclidean distance or the like may be used.

Subsequently, the judgment unit 113 judges which feature value stored in the feature value storage unit 111 matches the feature value of the captured image of the management target based on the score calculated by the score calculation unit 112. For example, the judgment unit 113 sorts the scores between the query feature value obtained from the captured image of the management target and all the registered feature values stored in the feature value storage unit 111 and selects the registered feature value with the minimum score (minimum Hamming distance), Moreover, the judgment unit 113 outputs the product information linked with the selected registered feature value as the product information of the management target. The judgment unit 113 may set a threshold for the score in advance and judge whether the score exceeds the threshold. Then, in a case where any of the scores between the query feature value and all the registered feature values does not exceed the threshold, the judgment unit 113 judges that the management target product is not registered and outputs information representing authentication error. In this case, it is possible to use for the purpose of individual authentication such as judgment of authenticity of a management target.

Subsequently, the information exhibition unit 114 receives the product information and authentication error information obtained from the judgment unit 113 and displays the product information that is the result of individual identification of the management target product and individual authentication information.

Meanwhile, in a case where a local common structural feature (a template image) for each production die is stored in the local common structural feature storage unit 106, a method as shown below may be used. Firstly, the second image normalization unit 109 receives, as an input, a captured image with a local structural feature emphasized and a local common structural feature (a template image) for each production die, estimates a geometric deformation parameter that minimizes a difference in pixel value between these images, and outputs the captured image on which second image normalization has been executed for each production die. Moreover, the second feature extraction unit 110 selects a predetermined given number or less of pixels from the captured image for each production die after the second image normalization and, regarding selected pixels, which are pixels having been selected above, calculates a binary bit string as a feature value for each production die based on the magnitude relation of luminance values of the selected pixels.

Thus, according to this exemplary embodiment, it is possible to accurately align a captured image. This is because a captured image is aligned based on a local common structural feature appearing in common on a plurality of objects. As a result, it is possible to extract a feature value used for individual identification or the like from the same image area at all times in the case of images obtained by imaging the same object, and highly accurate individual authentication or the like is enabled.

Third Exemplary Embodiment

Figure 8:
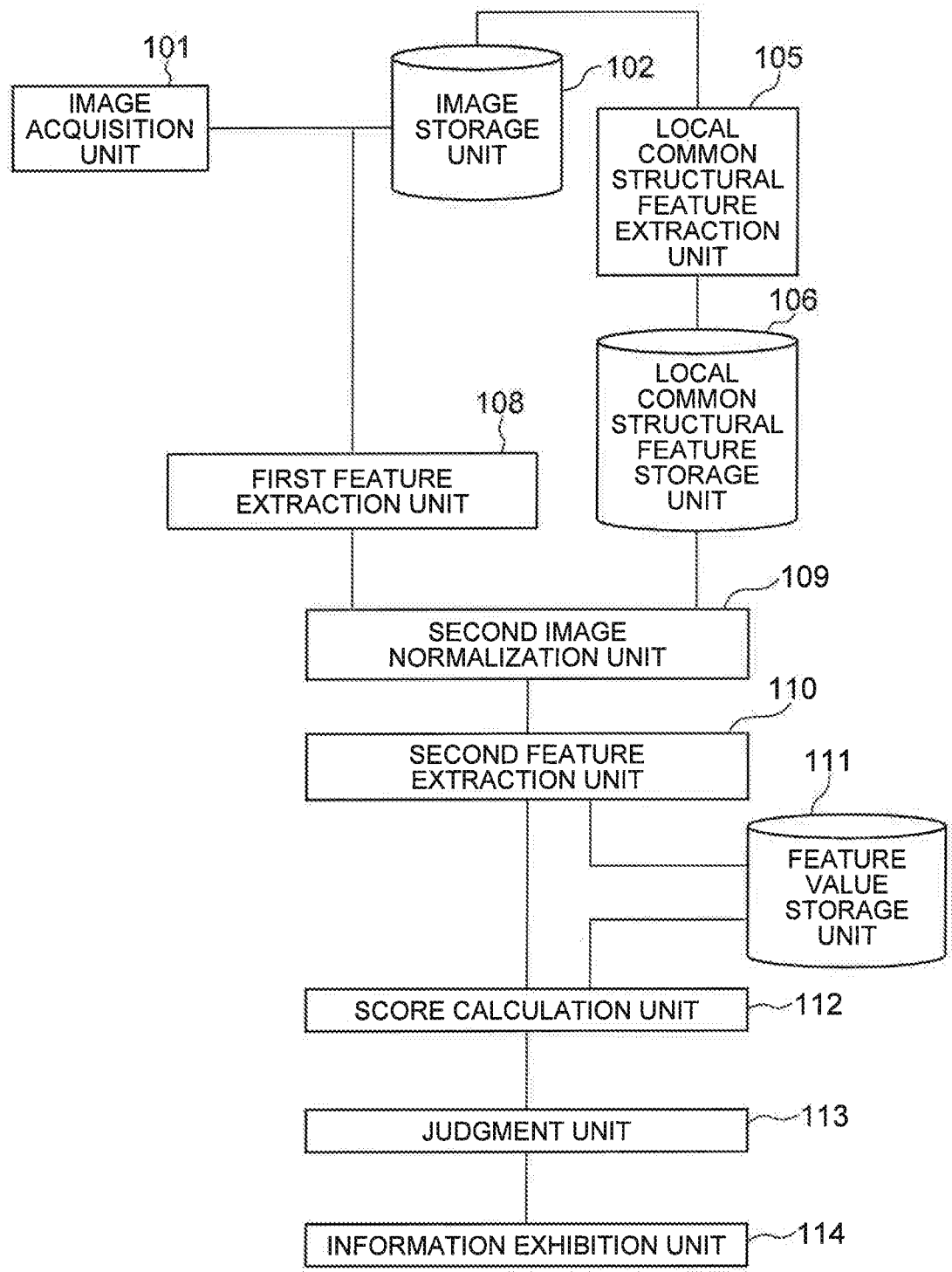
FIG. 8 is a block diagram of an object management device according to a third exemplary embodiment of the present invention.

Next, a third exemplary embodiment of the present invention will be described. FIG. 8 is a block diagram of an object management device 300 according to the third exemplary embodiment of the present invention.

The object management device 300 according to this exemplary embodiment has a configuration that the global common feature extraction unit 103, the global common feature storage unit 104 and the first image normalization unit 107 are excluded from the object management device 200 according to the second exemplary embodiment.

The object management device 300 includes the image acquisition unit 101, the image storage unit 102, the local common structural feature extraction unit 105, the local common structural feature storage unit 106, the first feature extraction unit 108, the second image normalization unit 109, the second feature extraction unit 110, the feature value storage unit 111, the score calculation unit 112, the judgment unit 113, and the information exhibition unit 114. These units have similar functions to those of the corresponding units in the second exemplary embodiment.

The object management device 300 can be realized by the information processing device 200 and the program 207, for example, as shown in FIG. 4. The program 207 is loaded from an external computer-readable recording medium to the memory when the information processing device 200 is started, and controls the operation of the arithmetic processing part 206, thereby realizing, on the arithmetic processing part 206, functional units such as the image acquisition unit 101, the image storage unit 102, the local common structural feature extraction unit 105, the local common structural feature storage unit 106, the first feature extraction unit 108, the second image normalization unit 109, the second feature extraction unit 110, the feature value storage unit 111, the score calculation unit 112, the judgment unit 113, and the information exhibition unit 114.

Next the operation of the object management device 300 according to this exemplary embodiment will be described with the use of the drawings. The operation of the object management device 300 will be roughly classified into the following three:
(a) operation of preprocessing of extracting a common feature;
(b) operation of individual registration; and
(c) operation of individual identification and individual matching.
[Preprocessing: Local Common Structural Feature Extraction Process]

Figure 9:
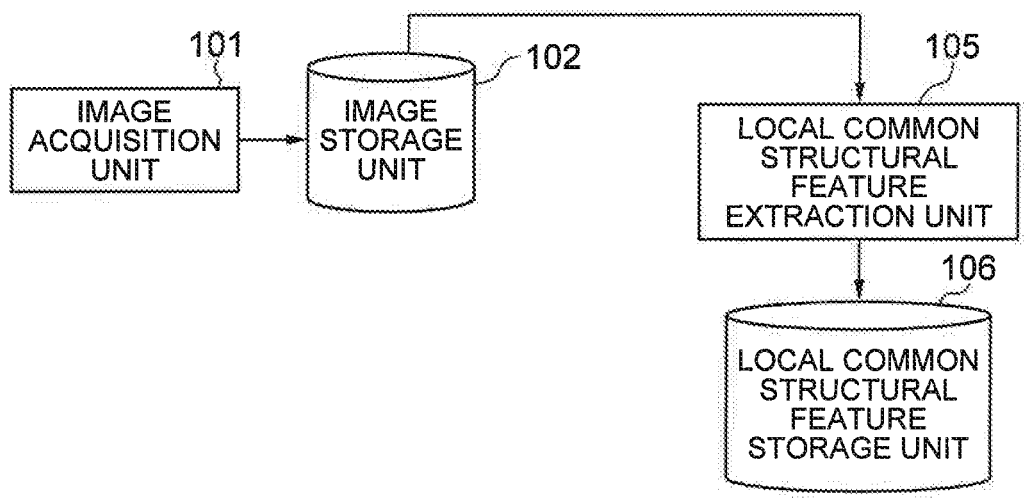
FIG. 9 is an operation flow of preprocessing for extracting a local common structural feature in the object management device according to the third exemplary embodiment of the present invention.

The operation of preprocessing of extracting a common feature in this exemplary embodiment is performed in accordance with an operation flow shown in FIG. 9. The operation of preprocessing of extracting a common feature in this exemplary embodiment is the same as the operation of preprocessing of extracting a common feature in the second exemplary embodiment described with reference to FIG. 5.
[Registration Operation]

Figure 10:
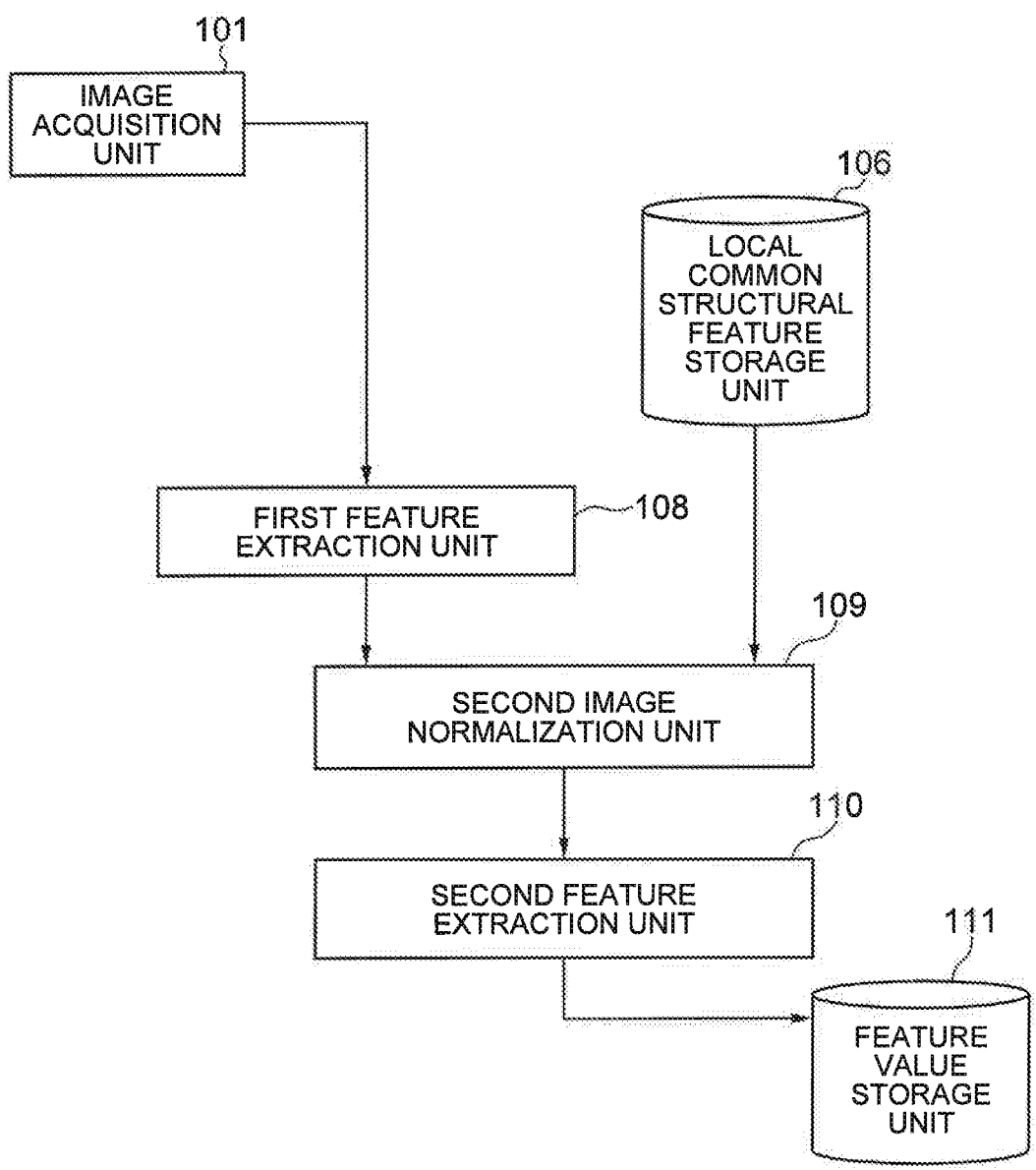
FIG. 10 is a processing flow of an individual registration operation in the object management device according to the third exemplary embodiment of the present invention.

The operation of individual registration in this exemplary embodiment is performed in accordance with the operation flow shown in FIG. 10. The operation of individual registration in this exemplary embodiment is the same as the operation of individual registration in the second exemplary embodiment described with reference to FIG. 6 except that the first feature extraction unit 108 emphasizes a local structural feature on a captured image inputted from the image acquisition unit 101.
[Identification/Matching Operation]

Figure 11:
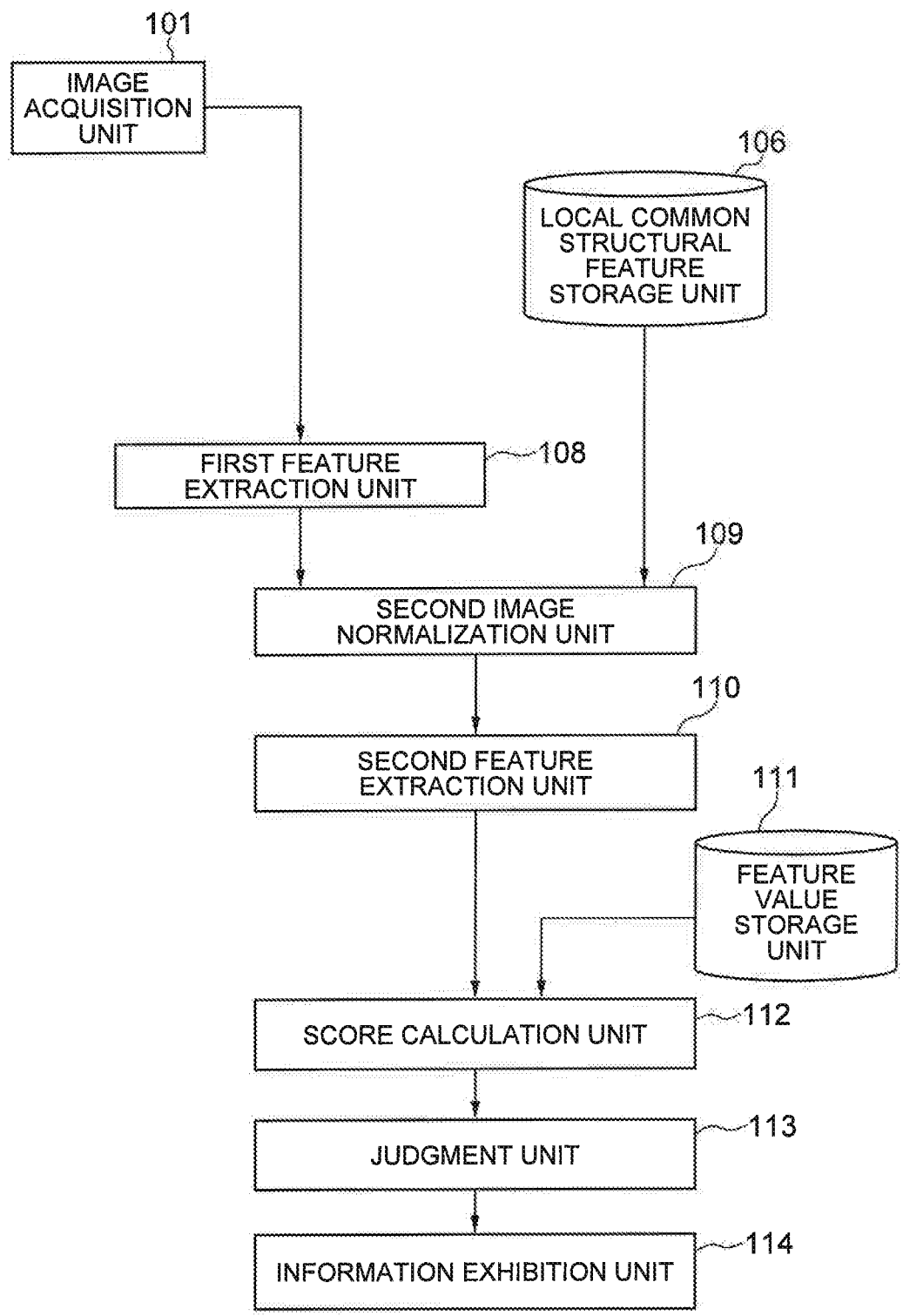
FIG. 11 is a processing flow of an individual identification and individual matching operation in the object management device according to the third exemplary embodiment of the present invention.

The operation of individual identification and individual matching in this exemplary embodiment is performed in accordance with the operation flow shown in FIG. 11. The operation of individual identification and individual matching in this exemplary embodiment is the same as the operation of individual identification and individual matching in the second exemplary embodiment described with reference to FIG. 7 except that the first feature extraction unit 108 emphasizes a local structural feature on a captured image inputted from the image acquisition unit 101.

Thus, according to this exemplary embodiment, it is possible to accurately align a captured image. This is because a captured image is aligned based on a local common structural feature appearing in common on a plurality of objects. As a result, it is possible to extract a feature value used for individual identification or the like from the same image area at all times in images obtained by imaging the same object, so that highly accurate individual authentication or the like is possible.

Further, according to this exemplary embodiment, since the global common feature extraction unit 103, the global common feature storage unit 104 and the first image normalization unit 107 are omitted, the configuration can be simplified as compared with the object management device 200 according to the second exemplary embodiment. However, because the first image normalization unit 107 is omitted, there is a case where a captured image with a local structural feature emphasized by the first feature extraction unit 108 inputted into the second image normalization unit is larger misaligned from a template image of a local common structural feature stored in the local common structural feature storage unit 106. Then, in such a case, the second image normalization unit 109 falls into a local solution in parameter estimation and fails in normalization (alignment). Therefore, it is desirable that this exemplary embodiment is used under a condition that the image acquisition unit 101 can acquire a captured image with small misalignment from a template image of a local common structural feature stored in the local common structural feature storage unit 106.

Although the present invention has been described above with some exemplary embodiments, the present invention is not limited to the above exemplary embodiments and can be changed and modified in various manners within the scope of the present invention. The configurations and details of the present invention can be changed in various manners that can be understood by one skilled in the art within the scope of the present invention.

The present invention is based upon and claims the benefit of priority from Japanese patent application No. 2016-049877, filed on Mar. 14, 2016, the disclosure of which is incorporated herein in its entirety by reference.

INDUSTRIAL APPLICABILITY

The present invention can be utilized in a field of carrying out individual identification and management of individual products by acquiring, as an image, a difference of spontaneous microscopic patterns generated in the same production process, such as microscopic irregularities and motifs on the surfaces of products and random patterns on the material surfaces and recognizing the microscopic pattern.

The whole or part of the exemplary embodiments disclosed above can be described as, but not limited to, the following supplementary notes.

[Supplementary Note 1]

An object management device capturing an image of a logo on a surface of a product with a camera and realizing individual management of the product based on a motif included in the captured image, the motif being unique to the product, the object management device comprising:

a unit configured to acquire a global common feature of management target products;

a unit configured to acquire a local common structural feature of management target products;

a first image position normalization unit configured to geometrically correct global misalignment of the captured image, the first image position normalization unit being configured to use the global common feature of the management target products;

a first feature extraction unit configured to emphasize a local structural feature included in the captured image after the position normalization process;

a second image position normalization unit configured to geometrically correct minute misalignment remaining in the captured image after the first image position normalization, the second image position normalization unit being configured to use the local common structural feature of the management target products;

a second feature extraction unit configured to calculate a feature value for identifying each product from the captured image after the second position normalization;

a score calculation unit configured to calculate similarity of the calculated feature value to a feature value stored on a database;

a judgment unit configured to output a result of judgment of the management target product based on the score; and an information exhibition unit configured to exhibit individual management information of the product based on the judgment result.

[Supplementary Note 2]

The object management device according to Supplementary Note 1, wherein the unit configured to extract the global common feature and the unit configured to extract the local structural feature e configured to use a captured image of at least one individual from among previously collected captured images of management target products and output the global common feature and the local structural feature as at least one template images, respectively.

[Supplementary Note 3]

The object management device according to Supplementary Note 2, wherein the first image position normalization unit includes:

a geometrical deformation parameter calculation unit configured to calculate an image geometrical deformation parameter based on a phase correlation in frequency component common to the captured image and the global common feature template image; and a geometrical deformation parameter calculation unit configured to, based on the captured image, the local common structural feature template image and the geometrical deformation parameter calculated based on the phase correlation, minimizes a difference in pixel value between the captured image and the local common structural feature template image.

[Supplementary Note 4]

The object management device according to Supplementary Note 3, wherein the first feature extraction unit configured to emphasize the local structural feature includes a unit configured to separate the captured image into local areas, decide an approximate plane that is a function approximately representing a set of pixel values for each of the local areas obtained by the separation, find a difference between a pixel value in the local area and a value on the approximate plane corresponding thereto, and divide by variation of the differences, thereby emphasizing a minute irregularity on an object surface.

[Supplementary Note 5]

The object management device according to Supplementary Note 4, wherein the second image position normalization unit includes a geometrical deformation parameter calculation unit configured to minimize a difference in pixel value between the captured image with an emphasized local structure obtained by the first feature extraction unit and the local common structural feature template image.

[Supplementary Note 6]

The object management device according to any of Supplementary Notes 2 to 4, further comprising a non-microscopic pattern extraction unit configured to extract a non-microscopic pattern that appears in common on the plurality of objects produced with the production die for each production die for producing the object based on a plurality of images of surfaces of the plurality of objects produced with the production die.

[Supplementary Note 7]

The object management device according to Supplementary Note 6, further comprising a parameter degree-of-freedom regulation unit configured to regulate so that a degree of freedom of a geometrical deformation parameter estimated in image position normalization by the second image position normalization unit becomes larger (higher) than a degree of freedom of a geometrical deformation parameter estimated in image position normalization by the first image position normalization unit.

[Supplementary Note 8]

The object management device according to Supplementary Note 7, further comprising:

a global common feature calculation unit configured to calculate the global common feature template image based on a previously collected captured image of a management target product;

a local common structural feature calculation unit configured to calculate the local common structural feature template image; and a weight coefficient calculation unit configured to calculate a weight coefficient for a pixel position and a frequency component with respect to at least either the global common feature template image or the local common structural feature template image, wherein the template image and the weight coefficient are given to the first image position normalization unit or the second image position normalization unit.

[Supplementary Note 9]

The object management device according to Supplementary Note 8, further comprising:

a global common feature calculation unit and a local common structural feature calculation unit configured to calculate a plurality of global common feature template images and a plurality of local common feature template images, respectively, based on a plurality of previously collected captured images of a management target product.

[Supplementary Note 10]

The object management device according to any of Supplementary Notes 1 to 8, further comprising a microscopic pattern extraction unit configured to extract a microscopic pattern that appears in common on the plurality of objects produced with the production die for each production die for producing the object based on a plurality of images of surfaces of the plurality of objects produced with the production die.

[Supplementary Note 11]

The object management device according to Supplementary Note 9, further comprising a unit configured to sample at least one individual for each production die or each lot from among management target products and, from captured images of the sampled individual, calculate a global common feature and a local common structural feature for each production die or each lot as template images.

[Supplementary Note 12]

The object management device according to any of Supplementary Notes 9 to 11, wherein the first image position normalization unit includes:

a geometrical deformation parameter calculation unit configured to, for a captured image and each of a plurality of global common structural feature template images, based on a phase correlation in frequency component common to the captured image and the template image, calculate a geometrical deformation parameter and a correlation value of the captured image; and a unit configured to use the correlation value as a weight for the template image and, based on the captured image, the plurality of global common feature template images, the geometrical deformation parameter and the weight for the template image, calculate a geometrical deformation parameter minimizing a difference in pixel value between the captured image and the template image and a weight for the template image.

[Supplementary Note 13]

The object management device according to Supplementary Note 12, wherein the second image position normalization unit includes a geometrical deformation parameter calculation unit configured to, by using a captured image processed by the first feature calculation unit, a plurality of local common structural feature template images and a weight for global common feature template images obtained by the first image position normalization unit, minimize a difference in pixel value between the captured image and the local common structural feature template images and a weight for each of the local common structural feature template images.

[Supplementary Note 14]

The object management device according to any of Supplementary Notes 2 to 13, wherein the second feature extraction unit includes:

a pixel selection unit configured to select a predetermined given number or less of pixels; and a unit configured to, with respect to selected pixels that are the pixels selected by the pixel selection unit, calculate a binary bit string based on a magnitude relation of luminance values of the selected pixels.

[Supplementary Note 15]

The object management device according to any of Supplementary Notes 2 to 13, wherein the first feature extraction unit is configured to, after the first feature extraction unit executes a process by the unit according to Supplementary Note 4, execute a process by the unit according to Supplementary Note 14.

[Supplementary Note 16]

The object management device according to Supplementary Note 14 or 15, wherein the second feature extraction unit according to Supplementary Note 14 or 15 includes a pixel selection determination unit configured to determine a pixel used in feature extraction based on previously collected captured images of management target products.

[Supplementary Note 17]

The object management device according to Supplementary Note 14, 15 or 16, wherein the second feature extraction unit according to Supplementary Note 14, 15 or 16 includes a pixel selection determination unit configured to measure a repetition width of a surface motif in a previously collected captured image of a management target product and, based on average and variation of the repetition width, determine a pixel pair at random.

DESCRIPTION OF NUMERALS 1 object management device
2 position correction unit
3 images
4, 5 microscopic patterns
100 object management devices
101 image acquisition unit
102 image storage unit
103 global common feature extraction
104 global common feature storage unit
105 local common structural feature extraction unit
106 local common structural feature storage unit
107 first image normalization unit
108 first feature extraction unit
109 second image normalization unit
110 second feature extraction unit
111 feature value storage unit
112 score calculation unit
113 judgment unit
114 information exhibition unit
200 information processing devices
201 imaging part
202 operation input part
203 screen display part
204 communication interface part
205 storage part
206 arithmetic processing parts
207 programs

The invention claimed is:

1. An object management device comprising:
a memory containing program instructions; and
a processor coupled to the memory,
wherein the processor is configured to execute the program instructions to:
acquire an image of a surface of an object;
align the image based on a first microscopic pattern that appears in common on a plurality of objects;
align the image based on a non-microscopic pattern that appears in common on the plurality of objects and that is larger in size than the first microscopic pattern before the alignment; and
acquire a plurality of images obtained by imaging surfaces of the plurality of objects produced by using a production die and, based on the plurality of images, extract the non-microscopic pattern for each production die for producing the object.

2. The object management device according to claim 1, wherein the processor is configured to match a template image including the non-microscopic pattern with the image and align the image.

3. The object management device according to claim 1, wherein the processor is configured to match a template image including the microscopic pattern that appears in common on the plurality of objects with the image and align the image.

4. The object management device according to claim 1, wherein the first microscopic pattern is a pattern based on a feature occurring in a process that the object is generated.

5. The object management device according to claim 1, wherein the processor is further configured to acquire a plurality of images of surfaces of the plurality of objects and extract the first microscopic pattern from the plurality of images.

6. The object management device according to claim 1, wherein the processor is further configured to acquire a plurality of images obtained by imaging surfaces of the plurality of objects produced by using the production die for each production die for producing the object and, extract the first microscopic pattern based on the plurality of images.

7. The object management device according to claim 1, wherein the processor is further configured to emphasize the first microscopic pattern in the image before the alignment.

8. The object management device according to claim 1, wherein the processor is further configured to extract, from the image after the alignment, a feature value dependent on a second microscopic pattern unique to the object.

9. The object management device according to claim 8, further comprising a storage device configured to retain the extracted feature value in association with an identification number of the object.

10. The object management device according to claim 8, wherein the processor is further configured to match the extracted feature value with a previously registered feature value of an object.

11. The object management device according to claim 1, wherein the first microscopic pattern is micrometer-scale.

12. An object management method comprising:
acquiring an image obtained by imaging a surface of an object;
aligning the image based on a first microscopic pattern that appears in common on a plurality of objects;
aligning the image based on a non-microscopic pattern that appears in common on the plurality of objects and that is larger in size than the first microscopic pattern before the alignment; and
acquiring a plurality of images obtained by imaging surfaces of the plurality of objects produced by using a production die and, based on the plurality of images, extract the non-microscopic pattern for each production die for producing the object.

13. A non-transitory computer-readable medium having stored thereon a program for causing a computer to:
image a surface of an object and acquire an image; and
align the image based on a first microscopic pattern that appears in common on a plurality of objects;
align the image based on a non-microscopic pattern that appears in common on the plurality of objects and that is larger in size than the first microscopic pattern before the alignment; and
acquire a plurality of images obtained by imaging surfaces of the plurality of objects produced by using a production die and, based on the plurality of images, extract the non-microscopic pattern for each production die for producing the object.

14. The object management method according to claim 12, wherein the first microscopic pattern is micrometer-scale.

15. The non-transitory computer-readable medium according to claim 13, wherein the first microscopic pattern is micrometer-scale.

* * * * *